Oct. 30, 1945.   E. D. REEVES   2,388,078
PROCESS FOR CONVERSION OF NORMAL BUTANE TO BUTADIENE
Filed Oct. 31, 1942   2 Sheets-Sheet 2

Edward D. Reeves Inventor
By  P. L. Young  Attorney

Patented Oct. 30, 1945

2,388,078

UNITED STATES PATENT OFFICE 2,388,078

PROCESS FOR CONVERSION OF NORMAL BUTANE TO BUTADIENE

Edward D. Reeves, Cranford, N. J., assignor to Standard Oil Development Company, a corporation of Delaware Application October 31, 1942, Serial No. 464,083

5 Claims. (Cl. 260—680)

This invention relates to improvements in the conversion of paraffins to diolefins and relates particularly to the conversion of normal butane to butadiene.

In the production of butadiene it is often desirable to start with normal butane as the feed stock. The conversion of normal butane to butadiene generally has involved a number of separate operations such as dehydrogenation of the normal butane to butylenes, concentration of the butylenes produced, further dehydrogenation of the butylenes to butadiene, and concentration of the butadiene produced.

It is an object of this invention to provide a process for effecting the complete conversion of normal butane to butadiene with a minimum of operating steps to obtain improved yields. This and other objects of the invention will be understood by reading the following description with reference to the drawings.

According to this invention the butane and butene dehydrogenation operations may either be done in fixed bed units or in fluid units and the absorption and stripping systems carried out using a solvent for vapor liquid separations. The separation of the various constituents obtained by the dehydrogenation operations is carried out in a plurality of stages, first a separation is made between propane and lighter materials and C4 hydrocarbons, second, a separation is made between normal butane and olefins and diolefins which remain in the extract, third, the olefins are separated from the diolefins and finally the diolefins are separated from the solvent. A single solvent is employed for making all these separations. The solvent used according to the following description is methyl amine-water solution which can make all of the separations indicated so there is no necessity for carrying out separate extraction operations in order to secure the separation of the various components. Other solvents may likewise be used for the same purpose.

Figure 1:
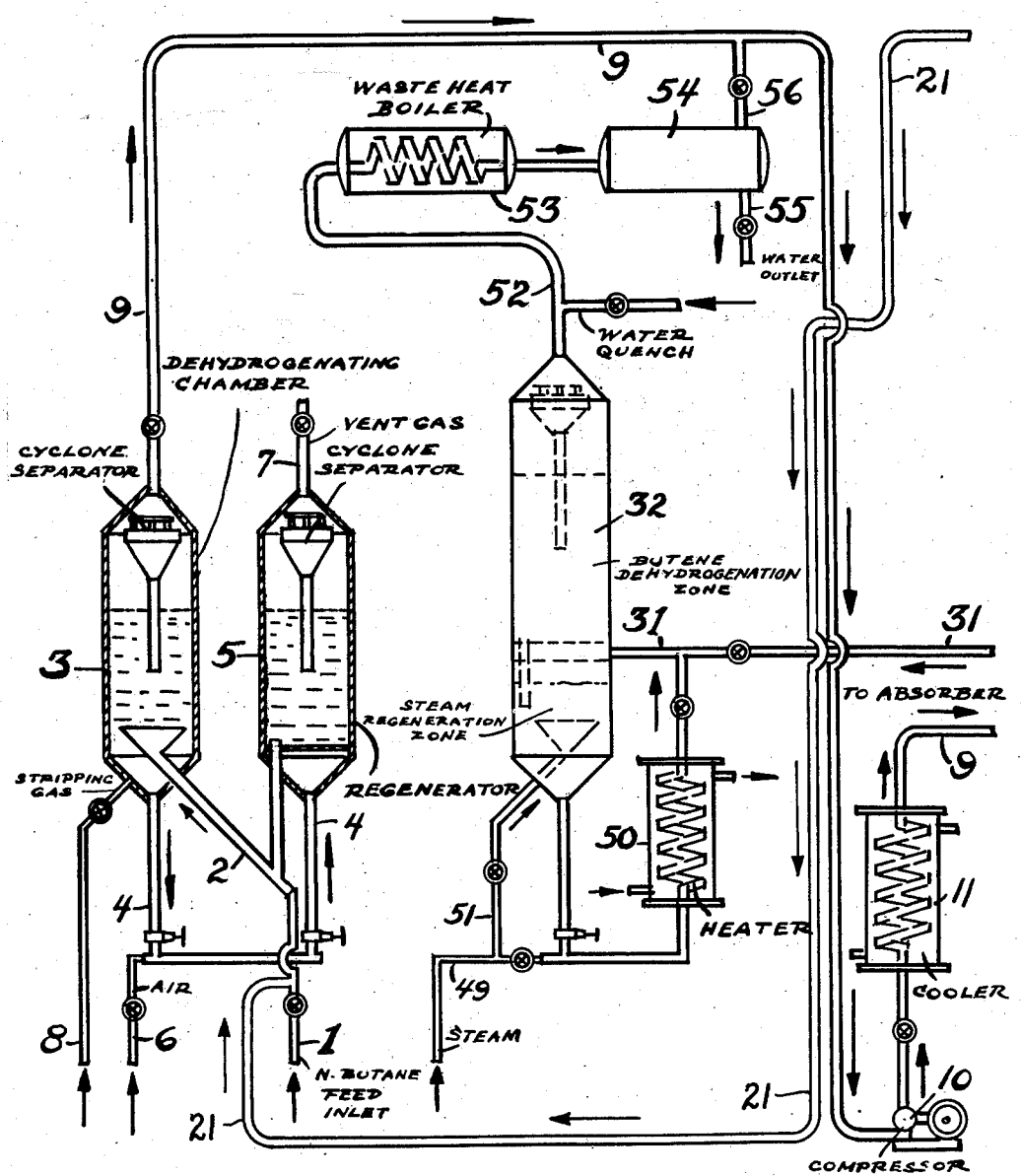
Figure 1A:
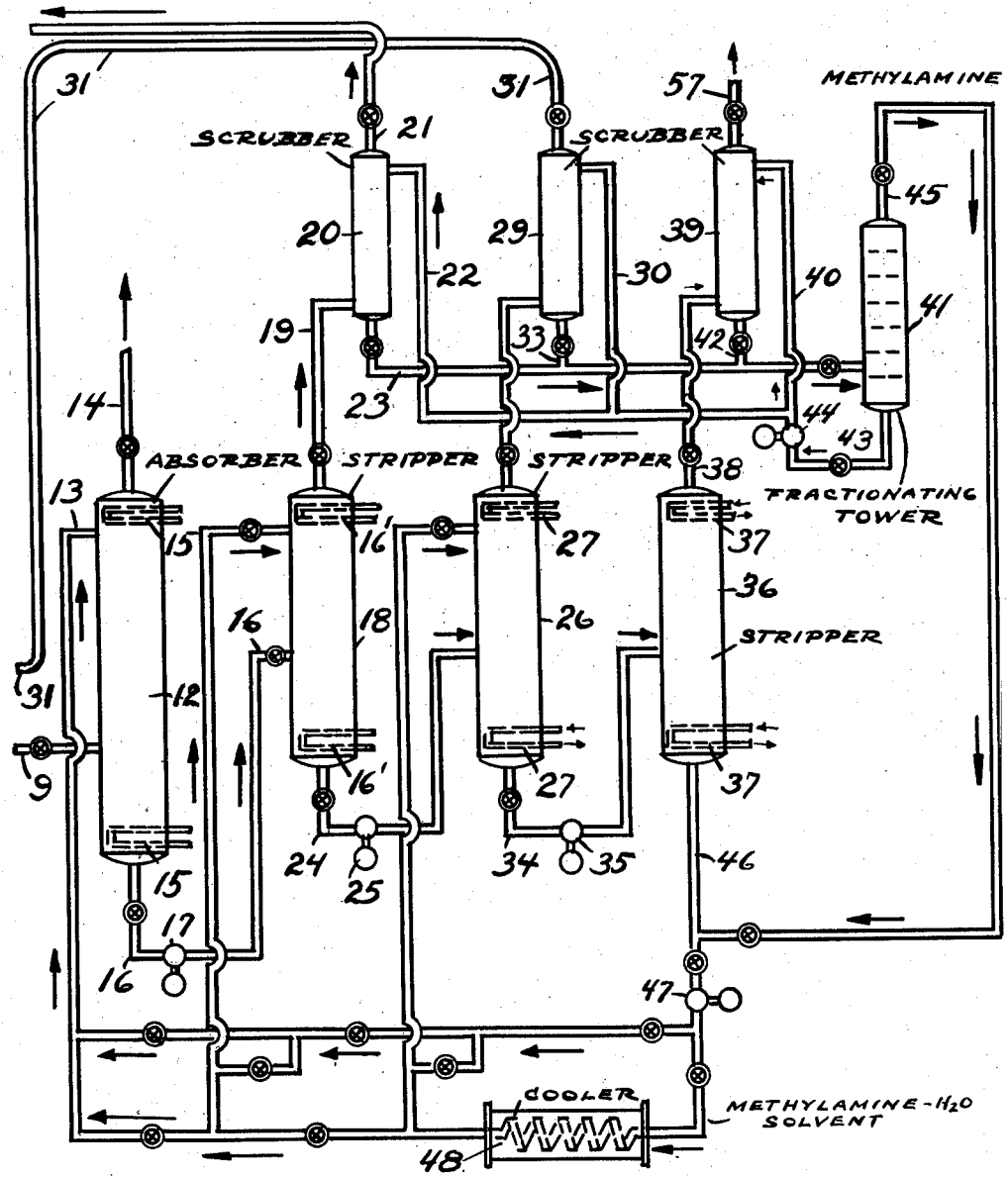

Referring to the drawings, Figs. 1 and 1A, showing diagrammatically the flow of materials, numeral 1 indicates a pipe through which normal butane is fed into pipe 2 through which is being passed a catalyst into dehydrogenating chamber 3. The mixture of catalyst and normal butane passes upwardly through the dehydrogenating chamber 3 to a cyclone separator at the top of the chamber where the catalyst and hydrocarbon are separated. A substantial volume of the catalyst is maintained in the dehydrogenating chamber 3 and a part is continuously removed through pipe 4 and passed through regenerator 5. Air is admitted into pipe 4 by means of inlet 6 to regenerate the catalyst. The regenerator is likewise provided with a cyclone separator in order to separate the catalyst from the gases which are vented through outlet 7. Stripping gases may be introduced into the butane dehydrogenator 3 by means of inlet 8 and used to regenerate the catalyst in dehydrogenating chamber 3. The dehydrogenated hydrocarbons are removed from the dehydrogenation chamber 3 by means of pipe 9, and passed through compressor 10, cooler 11 to absorber 12.

The dehydrogenation of normal butane may be conducted at temperatures in the range of 950° to 1150° F., at atmospheric pressure or thereabouts, with catalyst such as those containing one or more metals of the 6th group, for example chromium, molybdenum or tungsten in oxide form deposited on or co-precipitated with alumina. A particularly suitable catalyst may be prepared by co-precipitating chromia and alumina from a mixed salt solution of such concentration that the dried precipitate contains between 10% and 60% chromia.

The time of contact of the butane with the catalyst may be adjusted so that the conversion is between 20% and 60%, for example between 1 second and 40 seconds depending on the temperature and other reaction conditions. When employing powdered catalyst, the bulk of which is in the particle size range between 200 and 400 mesh, the butane weight space velocity (weight of butane per hour per weight of catalyst in the reactor) for 30% conversion may be 1–2 at 1000° F., 3–4 at 1050° F. and 5–8 at 1100° F. while for 60% conversion it may be 0.5–1.0 at 1050° F. and 1–2 at 1100° F. The contact time under these conditions may be in the range from 3 to 15 seconds. The activity of the catalyst is maintained by feeding regenerated catalyst to the reactor and withdrawing used catalyst for regeneration. The amount of regenerated catalyst passed to the reactor for this purpose is generally expressed as catalyst/oil ratio, by weight, and may be between 1/1 and 30/1, preferably between 3/1 and 20/1. This catalyst stream may be used to carry heat to the reaction zone; thus, hot catalyst may be withdrawn from a regenerator where carbonaceous materials are removed by burning with air supplied through pipe 6, and may be passed to the reactor in sufficient quantity to heat the feed stock and supply heat of reaction.

In absorber 12, Fig. 1A, the hydrocarbon gases are passed in countercurrent flow to a mixture of methyl amine and water, preferably at a ratio of about 3:1 although different ratios may be used. The solvent separates the C₄ hydrocarbons from the lighter hydrocarbons. The solvent is introduced into the upper part of the absorber 12 by means of pipe 13 and flows downward through the absorber 12 and absorbs the hydrocarbons having at least 4 carbon atoms to the molecule. Propane and propylene and higher hydrocarbons, are expelled through the upper part of the tower through pipe 14. Heat controlling coils 15 are provided for the upper and lower part of the tower to regulate the temperatures. The solvent with the C₄ hydrocarbons in solution then passes by means of pipe 16 provided with pump 17 into the first stripper 18 where the temperature is regulated by means of heat regulating coils to remove normal butane which is passed through pipe 19 to scrubber 20 and recycled to dehydrogenating chamber 3 by means of pipe 21. Water is used to scrub the hydrocarbon gas to remove the solvent, the water being passed through pipe 22 to the upper part of the scrubber and removed through pipe 23 from the bottom part of the scrubber. The pressure in stripper 18 is regulated by pump 17. The residual solvent with the butene and butadiene in solution is then removed from stripper 18 by means of pipe 24 provided with pump 25 and passed to the second stripper 26 where the temperature is raised sufficiently by means of heat regulating coils 27 and the pressure adjusted by means of pump 25 to expel the butenes which are passed through pipe 28 to scrubber 29. Butene in scrubber 29 is likewise scrubbed with water to remove the solvent. The butene, after being scrubbed, is passed through pipe 31 from scrubber 29 to the dehydrogenation chamber 32, the water being removed by means of pipe 33 from scrubber 29. The residual solvent, after separating the butenes and with butadiene in solution, is removed from the second stripper 26 through pipe 34 provided with pump 35 and passed through the third stripper 36 provided with heating coils 37 where butadiene is recovered overhead through pipe 38 and passed to scrubber 39 where it is likewise scrubbed with water provided by pipe 40. Substantially pure butadiene is recovered overhead through pipe 57 and passed to storage. The water is passed from scrubber 39 through pipe 42 and passed to fractionating tower 41 where methyl amine solvent is recovered overhead and the residual water is passed through pipe 43 provided with pump 44 and recycled to the various scrubbers. The methyl amine solvent recovered overhead is passed through pipe 45 and mixed with the residual solvent recovered from the third stripper 36 by means of pipe 46 and passed by means of pump 47 to a cooler 48 to the absorber 12. The butene fraction from scrubber 29, in pipe 31, is mixed with steam introduced by means of pipe 49 and superheated by means of heater 50 and passed into butene dehydrogenating chamber 32 containing catalyst. Steam is likewise introduced into the bottom of the dehydrogenating chamber 32 by means of pipe 51. The dehydrogenated butene is passed to cyclone separator at the top of the tower to separate the catalyst and as it passes through outward pipe 52, it is quenched with water to lower the temperature, passed through a waste heat boiler 53 to separator 54 where the water and hydrocarbons are separated in layers, the water being removed through pipe 55 and the hydrocarbons passed through pipe 56 into pipe 9 where it is mixed with the gases from the butane dehydrogenation.

The dehydrogenation of butene may be conducted at temperatures in the range of 1050° to 1300° F., preferably 1100° to 1225° F. A low total pressure or a low partial pressure of the butene feed stock is desirable, and the reaction may be conducted under a vacuum, say at 0.1 to 0.2 atmospheres, or at higher pressures, around atmospheric by diluting the butene with an extraneous gas, for example nitrogen or steam. Vacuum or an inert gas such as nitrogen can be employed with the known dehydrogenation catalysts, but steam deactivates many of them, particularly alumina base catalysts. Steam does not deactivate magnesia base catalysts, and can be used therewith not only to dilute the butene but to remove carbonaceous deposits from the catalyst. Either of two processes may be used, one employing a vacuum or an inert gas diluent in which carbonaceous deposits are removed intermittently by flushing out the hydrocarbon vapors and burning with air; and the other in which steam is employed as a diluent and coke remover during the reaction, and also to remove residual coke intermittently in the absence of hydrocarbon vapors. In the steam process, the ratio of steam/butene employed may be from 5 to 1 to 25 to 1, for example, and after one or two hours the flow of butene is discontinued and residual coke is removed by steaming. Either process can be conducted with stationary catalysts or with fluidized powdered catalysts.

The products from the butene dehydrogenation reactor are cooled quickly, preferably by water quenching, in order to inhibit thermal decomposition of butadiene. The products are then cooled further, for example in a waste heat boiler, condensed water is separated, and the vapors are passed to the absorption unit together with the products from the butane dehydrogenation reactor. The combined stream is cooled after compression before passing it to the absorption unit.

The overhead streams from the stripping stages are azeotropes of methyl amine and hydrocarbons which are separated by water scrubbing. The water solutions from the various scrubbers are combined for distillation and substantially no hydrocarbons are found present. The first stripper 18 is operated at about 90 lbs. per square inch pressure with a top temperature of about 107° F., and a bottom temperature of about 110° to 114° F. In order to obtain the required degree of separation, 50 or more plates are required at a 6:1 reflux ratio. The overhead azeotropes contain about 48% methyl amine, the remainder being substantially all normal butane. The second stripper 26 is operated at about 90 lbs. per square inch and should have a temperature ranging from 110° to 114° F., preferably 112° F. and a bottom temperature of 115° to 116° F. The boiling points and compositions of the azeotropes which will be removed overhead in this stage are as follows: 110° F. for the butene-1 azeotrope containing 60% by weight of amine; 111° F. for the trans-butene-2 azeotrope containing 58% by weight of amine; and 114° F. for the cis-butene-2 azeotrope containing 65% by weight of amine. In this stage also about 50 or more plates are required at a 6:1 reflux ratio.

The butadiene azeotrope obtained from the third stripper 36 boils at about 116° F. at 90 lbs. per square inch and contains about 72% by weight of amine. The bottom temperature may be about 150 to 160° F. Alternately, for the preliminary separation, however, it might be desirable from the standpoint of solvent losses to use an oil scrubbing system to effect the initial rejection of propane and lighter gases from the dehydrogenated products and merely use the selective solvent for the last three stages where a separation is made between normal butane, normal butylene, and butadiene.

I claim:

1. The process of converting paraffins to diolefins which comprises contacting butane with a dehydrogenation catalyst at a reaction temperature and pressure, separating hydrocarbons from the catalyst and contacting said hydrocarbons with a solvent to absorb hydrocarbons having at least 4 carbon atoms to the molecule, removing unreacted paraffins from the solvent and recycling the said unreacted paraffins to further contacting with the dehydrogenation catalyst, removing olefins from the solvent and contacting the olefins with a second dehydrogenation catalyst, separating hydrocarbons from the second dehydrogenation catalyst and admixing the hydrocarbons separated from the second dehydrogenation catalyst with the hydrocarbons separated from the first catalyst prior to contacting the latter hydrocarbons with the solvent and finally recovering from the solvent substantially pure diolefins.

2. The process of converting paraffins to diolefins which comprises contacting butane with a dehydrogenation catalyst composed of one or more oxides of metals of the 6th group deposited on alumina maintained at a temperature between 950° and 1150° F., separating hydrocarbons from the dehydrogenation catalyst and contacting said hydrocarbons with a solvent to absorb hydrocarbons having at least 4 carbon atoms to the molecule, removing unreacted paraffins from the solvent and recycling the unreacted paraffins for further contacting with the dehydrogenation catalyst, removing olefins from the solvent and contacting the olefins with a second dehydrogenation catalyst, separating hydrocarbons from the second dehydrogenation catalyst and admixing the hydrocarbons separated from the second dehydrogenation catalyst with the hydrocarbons separated from the first catalyst prior to contacting the latter hydrocarbons with the solvent and finally recovering from the solvent substantially pure diolefins.

3. The process of converting paraffins to diolefins which comprises contacting butane at a temperature ranging from 950° to 1150° F. with a mixture of one or more oxides of metals of the 6th group and alumina in powdered form, separating hydrocarbons from the catalyst and contacting said hydrocarbons with a solvent to absorb hydrocarbons having at least 4 carbon atoms to the molecule, removing unreacted paraffins from the solvent and recycling said paraffins for further contacting with the said catalyst, removing the olefins from the solvent, contacting the olefins with a second dehydrogenation catalyst at a temperature ranging from 1050° to 1300° F., separating hydrocarbons from the second dehydrogenation catalyst and admixing the said separated hydrocarbons with the hydrocarbons separated from the first catalyst prior to contacting the latter hydrocarbons with the solvent and finally recovering from the solvent substantially pure diolefins.

4. The process of converting paraffins to diolefins which comprises contacting butane with a dehydrogenation catalyst at a temperature ranging from 950° to 1150° F., separating hydrocarbons from the catalyst, contacting said hydrocarbons with a solvent to absorb hydrocarbons having at least 4 carbon atoms to the molecule, removing the unreacted paraffins from the solvent, recycling the separated paraffins to contact with the dehydrogenation catalyst, removing olefins from the solvent, contacting the said separated olefins with a second dehydrogenation catalyst at a temperature ranging from 1100° to 1225° F., separating hydrocarbons from the second dehydrogenating catalyst, admixing the separated hydrocarbons from the second dehydrogenating catalyst with the hydrocarbons separated from the first catalyst prior to contacting the latter hydrocarbons with the solvent and recovering from the solvent substantially pure diolefins.

5. The process of converting paraffins to diolefins which comprises contacting butane at a temperature ranging from 950° to 1150° F. with one or more oxides of metals of the 6th group deposited on alumina in powdered form, separating hydrocarbons from the catalyst, contacting said hydrocarbons with methyl amine to absorb hydrocarbons having at least 4 carbon atoms to the molecule, removing the unreacted paraffins from the methyl amine, recycling said paraffins to contact with the dehydrogenation catalyst, removing butenes from the methyl amine, contacting the butenes at a temperature ranging from 1100° to 1225° F., with a second dehydrogenating catalyst, separating hydrocarbons from the second dehydrogenating catalyst, admixing the hydrocarbons separated from the second dehydrogenating catalyst with the hydrocarbons separated from the first catalyst prior to contacting the latter hydrocarbons with the solvent, and finally recovering from the solvent substantially pure diolefins.

EDWARD D. REEVES.